(12) United States Patent
Horne et al.

(10) Patent No.: US 6,395,060 B1
(45) Date of Patent: May 28, 2002

(54) FURNACE FLUE DUST PROCESSING METHOD

(75) Inventors: Deane A. Horne, Toledo; Franklin G. Rinker, Perrysburg, both of OH (US)

(73) Assignee: Maumee Research & Engineering, Incorporated, Northwood, OH (US)

(*) Notice: Subject to any disclaimer, the term of this patent is extended or adjusted under 35 U.S.C. 154(b) by 0 days.

(21) Appl. No.: 09/597,923

(22) Filed: Jun. 19, 2000

(51) Int. Cl.[7] .................. C22B 7/02; C22B 19/30; C22B 17/00; C22B 13/00
(52) U.S. Cl. ............ 75/654; 75/669; 75/696; 75/754; 75/766; 75/771; 75/961; 423/108
(58) Field of Search .................. 75/961, 754, 654, 75/669, 696, 771, 766; 423/107, 108

(56) References Cited

U.S. PATENT DOCUMENTS

| | | |
|---|---|---|
| 3,850,613 A | 11/1974 | Allen |
| 4,209,322 A | 6/1980 | Janssen et al. |
| 4,238,222 A | 12/1980 | Serbent et al. |
| 4,255,185 A | 3/1981 | Schulte et al. |
| 4,266,966 A | 5/1981 | Stirling |
| 4,396,423 A | 8/1983 | Stephens, Jr. et al. |
| 4,396,424 A * | 8/1983 | Yatsunami et al. ........... 75/961 |
| 4,447,261 A | 5/1984 | Hilbrans et al. |
| 4,491,470 A | 1/1985 | Hilbrans et al. |
| 4,525,208 A | 6/1985 | Yasukawa et al. |
| 4,612,041 A | 9/1986 | Matsuoka et al. |
| 4,673,431 A | 6/1987 | Bricmont |
| 4,758,268 A | 7/1988 | Bishop et al. |
| 4,802,919 A | 2/1989 | Fey |
| 4,836,847 A | 6/1989 | Bishop et al. |
| 5,013,532 A | 5/1991 | Sresty |
| 5,180,421 A | 1/1993 | Rostoker et al. |
| 5,186,741 A | 2/1993 | Kotraba et al. |
| 5,198,190 A | 3/1993 | Philipp et al. |
| 5,338,336 A | 8/1994 | Greenwalt |
| 5,364,447 A | 11/1994 | Philipp et al. |
| 5,470,375 A | 11/1995 | Greenwalt |
| 5,496,392 A | 3/1996 | Sims et al. |
| 5,538,532 A | 7/1996 | Keegel, Jr. |
| 5,589,118 A | 12/1996 | Ford, Jr. et al. |
| 5,728,193 A * | 3/1998 | Dighe et al. ............... 75/10.19 |
| 5,843,204 A * | 12/1998 | Ishikawa et al. ............. 75/414 |
| 5,906,671 A | 5/1999 | Weinwurm et al. |
| 6,132,488 A * | 10/2000 | Hara et al. .................. 75/431 |

FOREIGN PATENT DOCUMENTS

EP 0 632 843 B1 3/1993

OTHER PUBLICATIONS

Osborne. An Encyclopedia of the Iron and Steel Industry. 1956. Philosophical Library, Inc.: New York. pp. 5, 49, and 83.*

Brochure—Value from EAF Dust–The ADPL Process—Apr. 10–12, 2000—Atlanta, Georgia USA.

Brochure—"First Experiences and Results of the BSN–Process to Recover Zinc and Lead from EAF Dust"—May 17–19, 2000—.

* cited by examiner

Primary Examiner—Roy King
Assistant Examiner—Tima McGuthry-Banks
(74) Attorney, Agent, or Firm—MacMillan, Sobanski & Todd, LLC

(57) ABSTRACT

A method of processing flue dust, where the flue dust contains one or more compounds from a first group of zinc, lead and cadmium compounds, and contains one or more compounds from a second group of iron, silicon, calcium, magnesium and aluminum compounds, includes mixing the flue dust with a carbonaceous material, heating the flue dust/carbonaceous material mixture under non-turbulent conditions to cause a substantial portion of the compounds from the first group to become gas-borne while retaining a substantial portion of the compounds of the second group in a non-gas-borne condition, and separating the gas-borne compounds from the non-gas-borne compounds.

17 Claims, 1 Drawing Sheet

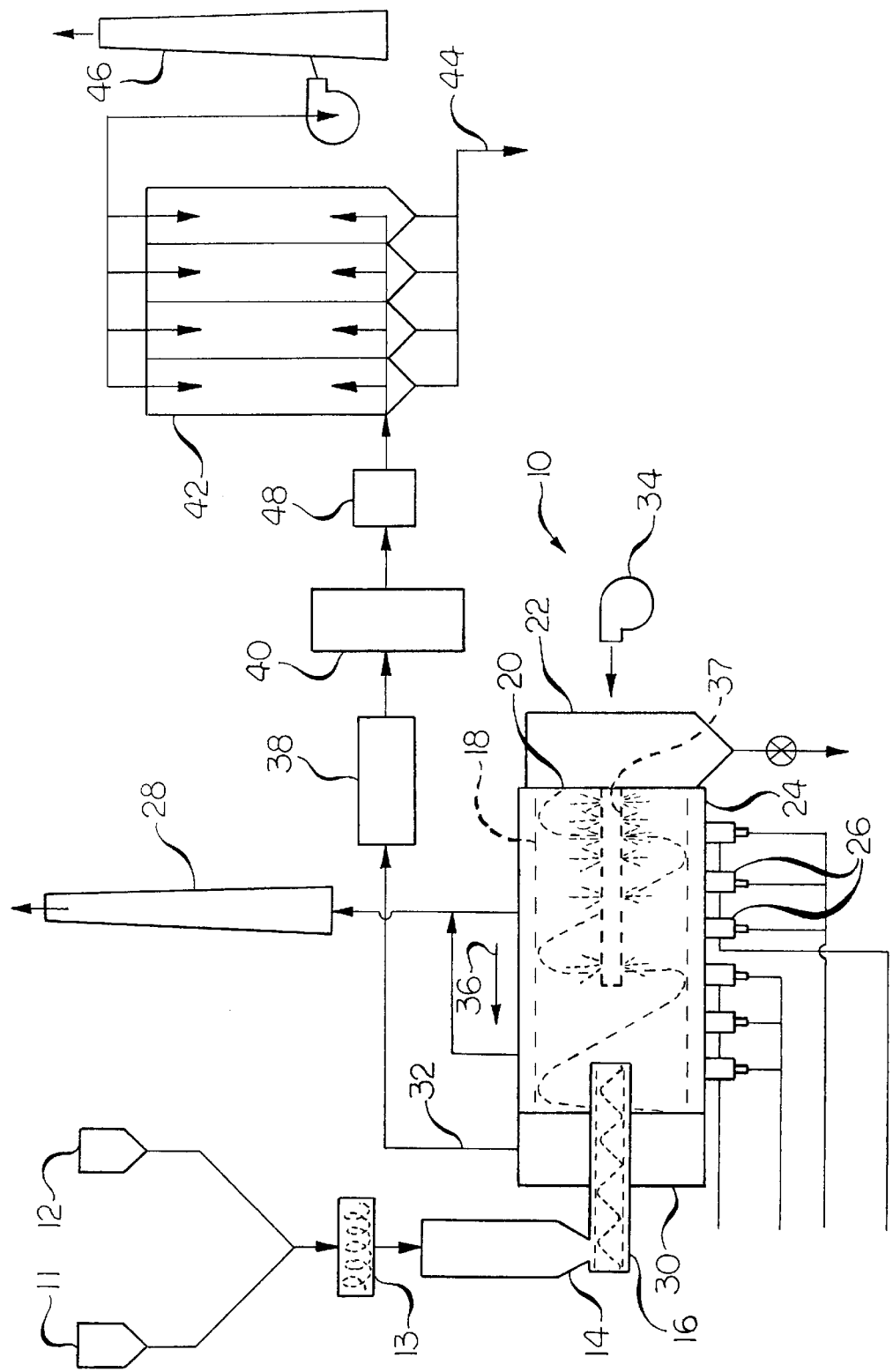

FURNACE FLUE DUST PROCESSING METHOD

TECHNICAL FIELD

This invention relates to a method of treating the flue dust of industrial processes, such as the flue dust from steel making processes which contain such materials as zinc, lead or cadmium, to segregate and thereby recover valuable constituents.

BACKGROUND OF THE INVENTION

Flue dust from certain steel making operations such as electric arc furnaces is classified as a hazardous waste material because of the presence of lead and cadmium. Also, it has been reported that electric arc furnace dust "contains several thousand nanogrammes of dioxins per kilogramme of dust". "Value from EAF Dust—The ADPL Process", by Kevin Holliday, published Apr. 10, 2000. Yet electric arc furnace dust contains valuable components if separation of the various constituents can be made economically. A process for recovering steel mill and foundry dusts containing zinc is disclosed in U.S. Pat. No. 3,850,613, which is herein incorporated by reference in its entirety. The flue dust is formed into compacts and then heated to reduce the zinc and lead to a metal, and then to volatilize the metal. The metal vapor is then combined with oxygen to form gas-borne metallic oxides.

A commonly used process for the processing of flue dust is the Waelz process, as disclosed in U.S. Pat. No. 4,525,208, which is also herein incorporated by reference in its entirety. The Waelz kiln process involves mixing carbon, usually in the form of coke or coal, with the flue dust to form a mixture, and then forming the carbon/flue dust mixture into compacts. The compacts are heated in a reducing atmosphere to volatilize the metallic zinc, and the metallic zinc is later reoxidized to form zinc oxide, a stable material having a high melting temperature. The process is carried out in a counterflow type rotary kiln. The iron is discharged in the form of reduced compacts, and the zinc oxide is carried gas-borne along with the kiln exhaust stream. A substantial portion of the heat, if not all of the heat required to initially vaporize the zinc is generated by the burning of the carbon in the carbon/flue dust mixture within the kiln. The combustion process within the kiln requires a substantial amount of air/oxygen, and the flow of this air, and the combustion process itself, generate a significant amount of turbulence within the kiln. As a result of this turbulence, a substantial amount of iron, calcium, silicon and aluminum compounds are also made gas-borne within the kiln, and these contaminate the exhaust stream of potentially valuable zinc oxides.

U.S. Pat. No. 5,013,532, discloses a process using a stream of hydrogen gas to reduce the zinc contained in electric arc furnace dust, followed by volatilizing the metallic zinc, and reoxidizing the metallic zinc to form zinc oxide. A process for removing zinc and other heavy metals from compacted furnace dust and carbon mixture is disclosed in U.S. Pat. No. 5,186,741, which is herein incorporated by reference in its entirety. A process for removing zinc, lead and cadmium from electric arc furnace dust, and metallizing the iron present in the dust to return it to the steel making operation is disclosed in U.S. Pat. No. 5,601,631, which is herein incorporated by reference in its entirety.

In addition to the processes for handling flue dust disclosed above, it is known to process flue dust in a rotary kiln that is heated exclusively by a heat source external of the kiln, such as by gas combustion on the outside of the kiln. The carbon necessary for the endothermic chemical reaction (to reduce the zinc and cadmium to a metallic, vaporized form) is supplied from the coke mixed with the flue dust. However, the lack of oxygen within the kiln substantially prevents combustion of the carbon, and essentially no heat is supplied to the flue dust internally of the kiln. Such an indirectly heated rotary kiln process is disclosed in a paper entitled "First Experiences and Results of the BSN-Process to Recover Zinc and Lead from EAF Dust", by Karl Haase, published May 17, 1999.

It would be advantageous if there could be developed flue dust handling processes that are even more efficient than those described above. Preferably, such a method would reduce the energy consumed in the process, and would result in greater purity of the separated constituents in the various output streams. Also, ideally, the ability to treat environmentally unfriendly substances such as dioxins and furans would be enhanced.

SUMMARY OF THE INVENTION

The above objects as well as other objects not specifically enumerated are achieved by a method of processing flue dust, where the flue dust contains one or more compounds from a first group of zinc, lead and cadmium compounds, and contains one or more compounds from a second group of iron, silicon, calcium, magnesium and aluminum compounds. The method includes mixing the flue dust with a carbonaceous material, heating the flue dust/carbonaceous material mixture under non-turbulent conditions to cause a substantial portion of the compounds from the first group to become gas-borne while retaining a substantial portion of the compounds of the second group in a non-gas-borne condition, and separating the gas-borne compounds from the non-gas-borne compounds.

According to this invention, there is also provided a method of processing flue dust, where the flue dust contains one or more compounds from a first group of zinc, lead and cadmium compounds, and contains one or more compounds from a second group of iron, silicon, calcium, magnesium and aluminum compounds. The method includes mixing the flue dust with a carbonaceous material, introducing the mixture of flue dust and carbonaceous material into a heating vessel and heating the vessel from a primary heating source. The carbonaceous material of the mixture within the vessel is combusted to further heat the flue dust. The heat from the primary source and the heat from the combustion of the carbonaceous material cause a substantial portion of the compounds from the first group to become gas-borne while retaining a substantial portion of the compounds of the second group in a non-gas-borne condition. The gas-borne compounds are separated from the non-gas-borne compounds.

According to this invention, there is also provided a method of processing flue dust comprising heating the flue dust to produce a gas stream containing one or more compounds from a first group of zinc, lead and cadmium compounds, where the gas stream further contains one or more compounds from an additional group of metallic chlorides and alkali metal oxides. The gas stream is maintained at a temperature at which the compounds from the additional group are gaseous and the compounds from the first group are solid, and the compounds from the additional group are separated from those compounds from the first group.

Various objects and advantages of this invention will become apparent to those skilled in the art from the following detailed description of the preferred embodiment, when read in light of the accompanying drawings.

BRIEF DESCRIPTION OF THE DRAWING

The drawing is a schematic view of the flue dust processing apparatus of the invention.

DETAILED DESCRIPTION OF THE INVENTION

The method of processing flue dust of the invention involves starting with a flue dust that contains one or more compounds from a first group of zinc, lead and cadmium compounds, and contains one or more compounds from a second group of iron, silicon, calcium, magnesium and aluminum compounds. The flue dust can come from numerous sources, but is typically the byproduct of a steel making operation that uses an electric arc furnace (EAF), a basic oxygen furnace (BOF) or similar processes. The flue dust is mixed with a carbonaceous material, which is preferably coke, but can be any other suitable form of carbon, as is well known in the art. The flue dust/carbonaceous material mixture is heated under non-turbulent conditions to cause a substantial portion of the compounds from the first group to become gas-borne while retaining a substantial portion of the compounds of the second group in a non-gas-borne condition. The gas-borne compounds are separated from the non-gas-borne compounds.

As shown in the drawing, the flue dust recovery apparatus is indicated generally at 10. The flue dust recovered from the electric arc furnace, or from any other source that contains one or more compounds from a first group of zinc, lead and cadmium, is supplied to a flue dust supply hopper 11. A fine carbonaceous material, such as coke, is supplied to a coke hopper 12. The flue dust and coke are both introduced into a blender 13 and the blended mixture is stored in a feed hopper 14. The blended mixture is subsequently supplied via a screw feeder 16 into the interior of an externally heated cylindrical retort 18, which can be a rotary kiln, rotating within a stationary insulation lined heating chamber 24.

Within the cylindrical retort 18, the carbonaceous material reacts with the zinc, lead and cadmium, producing a metallic form of those elements. The metallic zinc and cadmium vaporize or boil out of the mixture, and the lead comes out as lead chloride which is volatile at the typical operating temperature of about 1,800 degrees F. These vapors then mix with the gaseous compounds within the retort, reacting with oxygen and/or carbon dioxide to form gas-borne particles of zinc oxide, lead oxide and cadmium oxide. It should be appreciated by one skilled in the art that the crude zinc oxide produced in this way will exist as a very fine particulate that is easily entrained in the gas flow within the retort. One skilled in the art will also appreciate while the zinc, lead and cadmium compounds will boil out of the mixture as a gas phase, the iron, calcium, silicon and aluminum compounds in the flue dust will remain as solids in the mixture within the retort. The gases, including the very fine gas-borne zinc, lead and cadmium oxides, exit the feed end 30 of the retort through an exhaust duct 32 as an exhaust gas stream. The remaining solid flue dust mixture travels through the cylindrical retort 18 to the exit end 20 of the retort, and then the processed material is removed and collected in a discharge hopper 22 for removal as desired.

It will also be appreciated that the process described above is endothermic and thus requires energy input to proceed. The required energy is supplied to the flue dust/carbon material in the retort from two sources. The primary heating source, supplying 50 to 90 percent of the required energy, is an annular outer chamber 24 that surrounds the cylindrical retort 18 concentrically, and provides heat to the retort as the retort rotates. A fuel/oxygen combination, such as natural gas/air, is provided to a series of burners 26, producing combustion within the annular combustion chamber 19 to provide heat to the retort. Alternatively, electric heating elements (not shown), either spaced apart from the retort exterior surface or using the retort itself as a resistance heating element, may be used as the primary heating source to provide heat to the retort. Preferably, the retort structure is designed for good heat transfer through the retort walls from the annular outer chamber 24. The exhaust gases from the combustion process exit the annular combustion chamber 24 via exhaust stack 28. Since the annular chamber 24 is outside the cylindrical retort 18, as can be seen from the drawing, the primary source of heat is not within the retort, but rather is external of the retort.

The secondary source of heat supplying 10 to 50 percent of the required energy to the material in the retort is provided by partial combustion of the carbonaceous material in the mixture. The cylindrical retort 18 is a closed system and combustion within the retort is supported by a low velocity flow of air (or oxygen) provided by fan 34, thereby creating a low velocity gas flow in the retort. The preferred flow is in the direction of arrow 36, i.e., in the direction from the retort exit end 20 to the retort feed end 30, as shown in the drawing. This low velocity gas flow is counter to the flow of the feed mixture. However, the gas flow could be co-flowing with the mixture in the retort by interchanging the ends of the retort where the exhaust gas stream is removed and the air feed 34 is located. Optionally, the air (or oxygen) can be supplied into the retort using an orificed pipe or sparging conduit 37 that distributes the air according to a designed air distribution arrangement. The sparging conduit orifices for the release of air into the retort are preferably arranged so that there is a greater distribution of orifices in the upflow end of the sparging conduit 37, i.e., to the right as viewed in the drawing.

As shown in the drawing, the retort exhaust gas stream is further processed through an afterburner 38, typically at a temperature of about 1800 degrees F., to completely combust carbon monoxide and organic materials, such as dioxins and furans, released from the feed mixture. The exhaust flow is then quenched in a quencher 40, using either air or water, and filtered through a baghouse 42 where the particulate matter is removed from the exhaust gases as a particulate process stream 44. The remaining exhaust stream is vented through exhaust stack 46, or may be further processed as desired. Such further processing could include an additional step of passing the remaining exhaust gas stream through another afterburner prior to venting the remaining exhaust stream through the stack 46. This additional afterburner, not shown, could be similar to afterburner 38, and its purpose would be to combust the organic materials, such as dioxins and furans, released from the feed mixture. This additional afterburner could be used in place of or in combination with the afterburner 38.

In operation, a typical blend of carbonaceous material and furnace flue dust entering the cylindrical retort 18 is set to provide from about 15 to about 30 percent carbon by weight in the total mixture of flue dust and carbonaceous material, although other formulations can be used. The retort is heated to a temperature of about 1,800 degrees F. by the outer annular chamber using either a fuel/air mixture, or electric heating, and the mixture fed into the retort. The residence time in the retort is preferably within the range of from about 30 minutes to about 120 minutes, although many factors can influence the time needed for processing. The air added to the cylindrical retort 18 by the fan 34 supplies enough oxygen to combust some of the carbonaceous material in the feed mixture. The volume of air is low enough that the velocity (gas exchange) within the retort is kept very low, preferably within the range of from about 0.5 to about 2 feet per second, based on the volume of air introduced on a standard temperature and pressure basis, and on the cross-sectional area of the retort.

A low gas velocity within the retort is highly advantageous for the operation of the process of the invention. The principle desirable recoverable constituent of commercial value is zinc, in the form of zinc oxide, and as previously described, this material is easily entrained in a low velocity gas flow. The lead and cadmium compounds also become gas-borne, and are removed with the low velocity gas flow. In contrast, the bulk flue dust feed material contains larger and heavier particles and will not become entrained in the gas flow as long as the turbulence of the gas flow is minimized. The compounds of iron, calcium, silicon, magnesium and aluminum are not desirable in the zinc recovery stream, and therefore it is highly advantageous that these compounds do not become gas-borne, and preferably they remain in the retort for removal at the exit end 20 into the discharge hopper 22. It can be seen that by providing a substantial amount of the heating required for the process through the exterior of the retort, the amount of combustion required inside the retort is minimized, and therefore the volume, and thus the velocity and turbulence of the gases in the retort are markedly reduced.

As a measure of the reduction in gas flow and turbulence possible during operation of the invention, a comparison of mass flow rates between the process of the invention and a typical Waelz kiln process can be made. In a Waelz kiln process the ratio of the mass units of exhaust from the kiln to the mass units of the input EAF dust/carbon mixture is typically at least 4, and frequently higher. In contrast, using the invention, the ratio of the mass units of exhaust from the retort to the mass units of the input EAF dust/carbon mixture is preferably within the range of from about 0.5 to about 2.5, and more preferably within the range of from about 1.0 to about 2.0.

As another measure of the lower velocity within the retort, a comparison of the gas velocities within the retort in both the Waelz process and the process of the invention can be made. In a Waelz kiln process the gas has a net velocity of at least 4.0 feet per second in the flow direction 36, whereas, using the process of the invention, the gas flow has a net velocity within the range of from about 0.5 to about 1.5 feet per second. The net velocity is calculated using the mass flow rate of the constituents and the cross-sectional area of the retort.

One of the advantages of the reduced flow of the retort exhaust gas stream brought about by the use of the invention is that there is a smaller quantity of mass to be incinerated in the afterburner 38. This provides the benefit of an overall lower energy consumption to operate the process. Also, savings in capital costs can be realized because the afterburner equipment and all of the flue gas treatment components, including the quencher 40, optional separator 48, and baghouse 42 can be sized for a smaller throughput.

In operation, a typical blend of fuel and flue dust entering the cylindrical retort 18 is primarily zinc, carbon and iron, as shown in the Table below. The processed material passing through the retort and recovered in the discharge hopper 22 is predominately iron oxides. Calcium oxide, alumina and silica are also present in significant amounts, while the zinc, cadmium, and lead constituents are substantially removed. In contrast, the fume material (stream 44) is predominately zinc oxide and includes only trace amounts of iron. Material such as this is a valuable feed stock to zinc refiners.

As shown in the Table below, the metal compound collected in the baghouse is primarily zinc oxide, with minor amounts of lead oxide, and cadmium oxide and chloride.

TABLE

| Material Constituencies | | | |
| --- | --- | --- | --- |
| | Blended Mixture (Flue Dust and Coke) | Processed Flue Dust In Discharge Hopper | Fume Stream |
| Carbon | 20.4% | 0.026% | — |
| Zinc | 14.8% | 1.01% | 65.7% |
| Cadmium | 0.029% | <0.001% | 0.1% |
| Lead | 1.51% | 0.005% | 6.4% |
| Iron | 21.2% | 41.0% | 0.22% |
| Silica | 3.0% | 5.2% | — |
| Alumina | 0.96% | 1.7% | — |
| Chloride | 3.6% | — | 16% |

As can be seen from the Table, the amount of iron in the recovered fume stream 44 is less than 1 percent. In contrast, in a Waelz kiln process the fume stream is contaminated by iron in an amount that is typically within the range of from about 2.5 to about 7.5 percent. Accordingly, the purity of the recovered crude zinc oxide is vastly improved by the process of the invention.

Although the invention has been illustrated as using a cylindrical retort, it is to be understood that the process of the invention can be carried out using other heating equipment, such as furnaces or ovens, where the flue dust is heated under non-turbulent conditions, and a low velocity gas flow removes practically all of the zinc, cadmium and lead, without removing significant amounts of iron, lime, silica or alumina. One of the advantages of the invention is that there is no need for briquetting the flue dust, although the invention can be used with the inclusion of a briquetting step. Instead, the flue dust is merely blended with fine carbonaceous material and introduced into the cylindrical retort.

Some of the constituents of the retort exhaust gas stream are alkali metals and metallic chlorides. The alkali metals found in such retort exhaust streams are typically, sodium and potassium. Metallic chlorides for purposes of this invention include iron, zinc, lead, and cadmium chlorides, It would be advantageous if these chloride compounds could be removed from the fume stream 44.

Typically, metallic chlorides are more volatile than the corresponding metallic oxides. In the case of the alkali metals, both the oxides and chlorides are more volatile than the oxides of zinc, lead, and cadmium. It would be advantageous if the chloride compounds and alkali metals could be separated from the zinc, lead, and cadmium oxides. Therefore, an optional separator 48 can be inserted into the process to remove the solid zinc, lead, and cadmium oxides, from the gaseous chloride and alkali metal compounds. Typically, this can be accomplished by maintaining the gas stream in the separator 48 at a temperature greater than about 500 degrees F., so that the chloride and alkali metal compounds remain as a vapor. At temperatures below about 1000 degrees F. the oxides from the group of zinc, lead and cadmium remain solid, and these can be removed from the vaporous chloride and alkali metal compounds using a cyclone separator or any other suitable means. The resulting output is a high purity zinc oxide stream 49.

In summary, it can be seen the method of the invention involves producing a gas stream containing solid metallic oxides from a first group of zinc, lead and cadmium, and further containing one or more compounds from an additional group of metallic chlorides and alkali metal oxides, maintaining the gas stream at a temperature at which the metallic chlorides and alkali metal oxides are gaseous and the solid metal oxides remain solid, and separating the solid metal oxides from the metallic chlorides and alkali metal oxides.

The principle and mode of operation of this invention have been described in its preferred embodiments. However, it should be noted that this invention may be practiced otherwise than as specifically illustrated and described without departing from its scope.

What is claimed is:

1. A method of processing flue dust that contains one or more compounds from a first group consisting of zinc, lead and cadmium compounds, and contains one or more compounds from a second group consisting of iron, silicon, calcium, magnesium and aluminum compounds, the method comprising mixing the flue dust with a carbonaceous material, introducing the mixture of flue dust and carbonaceous material into a heating vessel, heating the vessel from a primary heating source, combusting the carbonaceous material within the vessel to further heat the flue dust, wherein the heat from the primary source and the heat from the combustion of the carbonaceous material cause a substantial portion of the compounds from the first group to become gas-borne while retaining a substantial portion of the compounds of the second group in a non-gas-borne condition, wherein the iron content of the gas-borne compounds is less than 1 percent by weight, and separating the gas-borne compounds from the non-gas-borne compounds.

2. The method of claim 1 in which the flue dust/carbonaceous material mixture is heated in a rotating cylindrical retort.

3. The method of claim 2 in which heat is applied to the retort from a source external to the rotating cylindrical retort.

4. The method of claim 1 in which the amount of carbonaceous material in the flue dust/carbonaceous material mixture is within the range of from about 10 to about 30 percent by weight of the total mixture of flue dust and carbonaceous material.

5. The method of claim 1 including removing zinc compounds from the separated gas-borne compounds.

6. A method of processing flue dust that contains one or more compounds from a first group consisting of zinc, lead and cadmium compounds, and contains one or more compounds from a second group consisting of iron, silicon, calcium, magnesium and aluminum compounds, the method comprising mixing the flue dust with a carbonaceous material, introducing the mixture of flue dust and carbonaceous material into a heating vessel, heating the vessel from a primary heating source, combusting the carbonaceous material within the vessel to further heat the flue dust, wherein the heat from the primary source and the heat from the combustion of the carbonaceous material cause a substantial portion of the compounds from the first group to become gas-borne while retaining a substantial portion of the compounds of the second group in a non-gas-borne condition, and wherein the amount of energy supplied by the primary heating source is within the range of from about 25 to about 90 percent of the total energy supplied to the flue dust, and the amount of energy supplied by the combustion of the carbonaceous material is within the range of from about 10 to about 75 percent of the total energy supplied to the flue dust, and separating the gas-borne compounds from the non-gas-borne compounds.

7. The method of claim 6 in which the primary heating source is external of the heating vessel.

8. The method of claim 6 in which the amount of energy supplied by the primary heating source is within the range of from about 50 to about 75 percent of the total energy supplied to the flue dust, and the amount of energy supplied by the combustion of the carbonaceous material is within the range of from about 25 to about 50 percent of the total energy supplied to the flue dust.

9. The method of claim 6 in which the vessel is a cylindrical retort.

10. The method of claim 6 including removing zinc compounds from the separated gas-borne compounds.

11. A method of processing flue dust that contains one or more compounds from a first group consisting of zinc, lead and cadmium compounds, and contains one or more compounds from a second group consisting of iron, silicon, calcium, magnesium and aluminum compounds the method comprising mixing the flue dust with a carbonaceous material, heating the flue dust/carbonaceous material mixture in a heating vessel to cause a substantial portion of the compounds from the first group to become gas-borne while retaining a substantial portion of the compounds of the second group in a non-gas-borne condition, establishing a gas flow within the heating vessel to remove the separated gas-borne compounds from the heating vessel, and separating the gas-borne compounds from the non-gas-borne compounds by exhausting gases from the heating vessel, wherein the ratio of the mass units of the exhaust from the heating vessel to the mass units of the mixture of flue dust with the carbonaceous material is within the range of from about 0.5 to about 2.5.

12. The method of claim 11 in which the amount of carbonaceous material in the flue dust/carbonaceous material mixture is within the range of from about 10 to about 30 percent by weight of the total mixture of flue dust and carbonaceous material.

13. The method of claim 11 in which the flue dust/carbonaceous material mixture is heated in a rotating cylindrical retort, wherein heat is applied to the retort from a source external to the rotating cylindrical retort.

14. The method of claim 13 wherein the heating step includes heating the vessel from a primary heating source external of the vessel and combusting the carbonaceous material within the vessel to further heat the flue dust, and further wherein the amount of energy supplied by the primary heating source is within the range of from about 50 to about 75 percent of the total energy supplied to the flue dust, and the amount of energy supplied by the combustion of the carbonaceous material is within the range of from about 25 to about 50 percent of the total energy supplied to the flue dust.

15. A method of processing flue dust that contains one or more compounds from a first group consisting of zinc, lead and cadmium compounds, and contains one or more compounds from a second group consisting of iron, silicon, calcium, magnesium and aluminum compounds, the method comprising mixing the flue dust with a carbonaceous material, heating the flue dust/carbonaceous material mixture in a heating vessel to cause a substantial portion of the compounds from the first group to become gas-borne while retaining a substantial portion of the compounds of the second group in a non-gas-borne condition, establishing a gas flow within the heating vessel to remove the separated gas-borne compounds from the heating vessel, and separating the gas-borne compounds from the non-gas-borne compounds by exhausting gases from the heating vessel, wherein the heating step includes heating the vessel from a primary heating source external of the vessel and combusting the carbonaceous material within the vessel to further heat the flue dust, and further wherein the amount of energy supplied by the primary heating source is within the range of from about 50 to about 75 percent of the total energy supplied to the flue dust, and the amount of energy supplied by the combustion of the carbonaceous material is within the range of from about 25 to about 50 percent of the total energy supplied to the flue dust, and wherein the ratio of the mass units of exhaust from the kiln to the mass units of the input EAF dust/carbon mixture is within the range of from about 1.0 to about 2.0.

16. The method of claim 15 in which the amount of carbonaceous material in the flue dust/carbonaceous material mixture is within the range of from about 10 to about 30 percent by weight of the total mixture of flue dust and carbonaceous material.

17. The method of claim 15 in which the iron content of the gas-borne compounds removed from the heating vessel is less than 1 percent by weight.

* * * * *